United States Patent
Bartok et al.

(10) Patent No.: US 7,130,993 B1
(45) Date of Patent: Oct. 31, 2006

(54) FIRMWARE INTERFACE INTEGRATED SYSTEM REPORTING AND DIAGNOSTIC TOOL

(75) Inventors: James Michael Bartok, Lake Forest, CA (US); Edward Henry Collins, Costa Mesa, CA (US)

(73) Assignee: Unisys Corporation, Blue Bell, PA (US)

( * ) Notice: Subject to any disclaimer, the term of this patent is extended or adjusted under 35 U.S.C. 154(b) by 433 days.

(21) Appl. No.: 10/611,175

(22) Filed: Jul. 1, 2003

(51) Int. Cl.
*G06F 13/10* (2006.01)
*G06F 9/00* (2006.01)
*G06F 15/177* (2006.01)

(52) U.S. Cl. .................. 713/1; 713/2; 710/33; 714/37
(58) Field of Classification Search ............. None
See application file for complete search history.

(56) References Cited

U.S. PATENT DOCUMENTS

| | | | |
|---|---|---|---|
| 6,119,192 A * | 9/2000 | Kao et al. | 710/311 |
| 6,272,584 B1 * | 8/2001 | Stancil | 710/241 |
| 6,584,560 B1 * | 6/2003 | Kroun et al. | 713/2 |
| 6,691,224 B1 * | 2/2004 | Yeh et al. | 713/2 |
| 6,779,052 B1 * | 8/2004 | Hatano | 710/33 |
| 6,826,715 B1 * | 11/2004 | Meyer et al. | 714/37 |
| 2002/0147868 A1 * | 10/2002 | Tsai | 710/104 |

* cited by examiner

*Primary Examiner*—Lynne H. Browne
*Assistant Examiner*—Fahmida Rahman
(74) *Attorney, Agent, or Firm*—Phuong-Quan Hoang; Mark T. Starr; Lise A. Rode (57) ABSTRACT

An embodiment of the present invention is a technique to obtain system information on a platform. Information on system configuration of a platform is read using a firmware interface. The platform has at least a processor, a memory, a chipset, and a bus device. The information includes at least processor information, memory information, chipset information, and bus device information. The information is organized according to a predefined format.

24 Claims, 5 Drawing Sheets

FIRMWARE INTERFACE INTEGRATED SYSTEM REPORTING AND DIAGNOSTIC TOOL

BACKGROUND

1. Field of the Invention

Embodiments of the invention relate to the field of microprocessors, and more specifically, to system information reporting.

2. Description of Related Art

Advances in microprocessor technologies have provided opportunities to build high performance systems with complex-architectures and highly integrated functionalities. A typical microprocessor system can pack a large number of devices and components on a very small platform. These devices may include processor chipset, multi-function peripheral devices, memory elements, interface devices, etc.

As systems become more and more complex, it is important to be able to provide information regarding the system configuration and resource requirements for various purposes such as diagnostics, reporting, testing, and documentation. The information on the system configuration includes parameters, constants, values, and other information on various devices in the system. This information is useful for testing, determining optimum configurations, diagnostic, and documentation. However, due to a large number of devices that are provided from different vendors, or even if the same vendor, it is very difficult to obtain the information.

SUMMARY OF THE INVENTION

An embodiment of the present invention is a technique to obtain system information on a platform. Information on system configuration of a platform is read using a firmware interface. The platform has at least a processor, a memory, a chipset, and a bus device. The information includes at least processor information, memory information, chipset information, and bus device information. The information is organized according to a predefined format.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to obtain system information on a platform. Information on system configuration of a platform is read using a firmware interface. The platform has at least a processor, a memory, a chipset, and a bus device. The information includes at least processor information, memory information, chipset information, and bus device information. The information is organized according to a predefined format.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
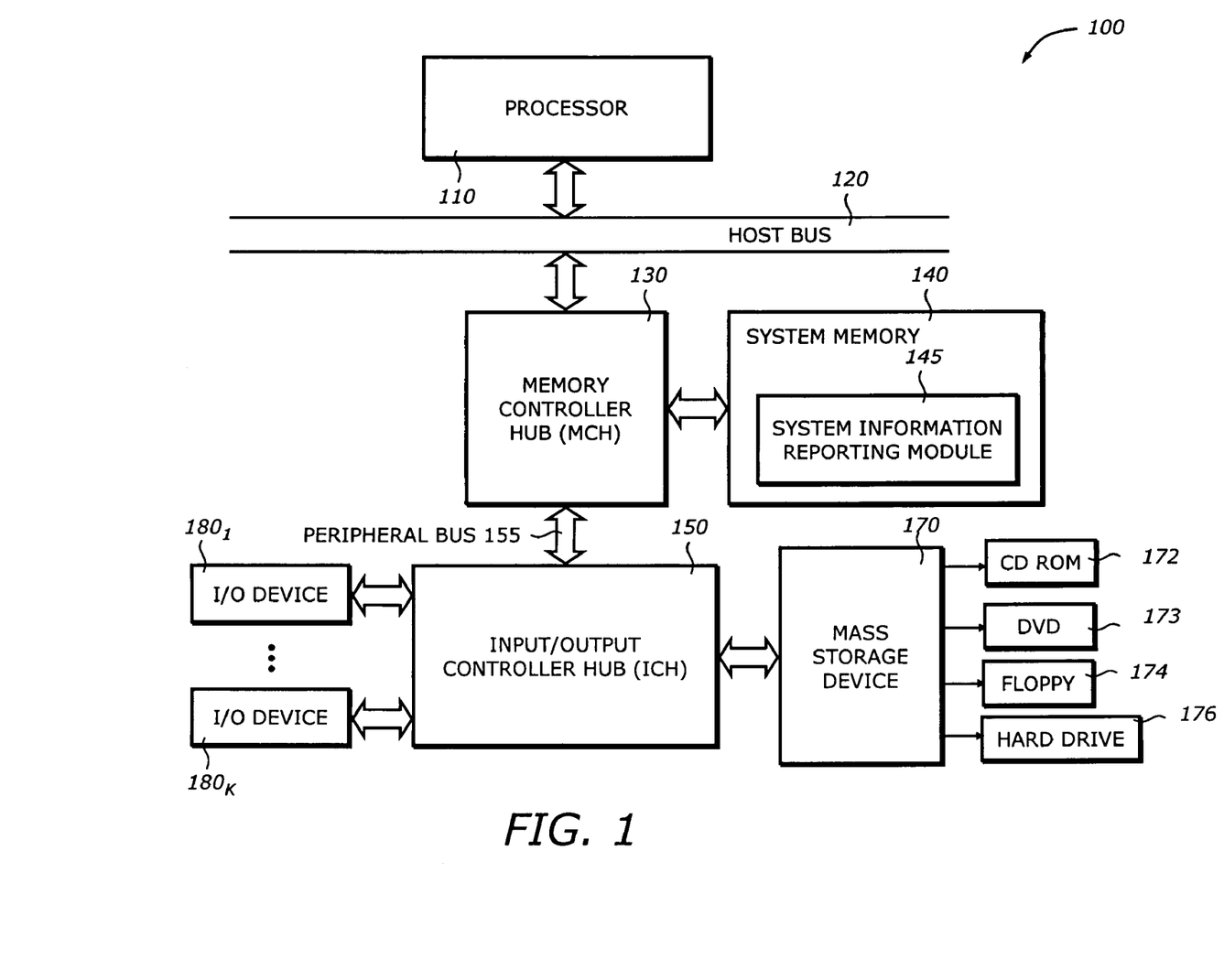
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. Typically, there is a firmware interface that is compatible with the processor 110 to provide access to its hardware configurations and information. The firmware interface includes a set of calls and functions to read information on the processor 110. In one embodiment, the processor 110 is an IA-64 compatible processor that is configured to have Extensible Firmware Interface (EFI) capabilities and IA-64 System Abstraction Layer (SAL) functionality.

The processor bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a system information reporting module 145. Any one of the elements of the system information reporting module 145 may be implemented by hardware, software, firmware, microcode, or any combination thereof. The system memory 140 may also include other programs or data which are not shown, such as an operating system. The system information reporting module 145 may implement all or part of the reporting/diagnostic functions. The system information reporting module 145 may also simulate the reporting/diagnostic functions. The system information reporting module 145 contains instructions that, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, databases, applications, and operating systems. The mass storage device 170 may include compact disk (CD) ROM 172, a digital video/versatile disc (DVD) 173, floppy drive 174, and hard drive 176, and any other magnetic or optic storage devices such as tape drive, tape library, redundant arrays of inexpensive disks (RAIDs), etc. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as Institute of Electrical and Electronics Engineers (IEEE) 802.3, IEEE-1394, IEEE-802.11x, Bluetooth, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

The present invention is a technique to obtain system information on a platform and organize the information in a pre-defined format. One embodiment of the invention is the system information reporting module 145. The system information reporting module 145 is a utility that probes information on the hardware configuration of the system, especially the IA-64 processor-based systems. The information is gathered and presented for display or redirected to a file or archiving. The information can be used for a variety of purposes including diagnosis, determining optimum configurations, documentation, and reporting. All information regarding hardware configuration can be displayed or organized together to enhance system diagnostics and reporting.

Figure 2:
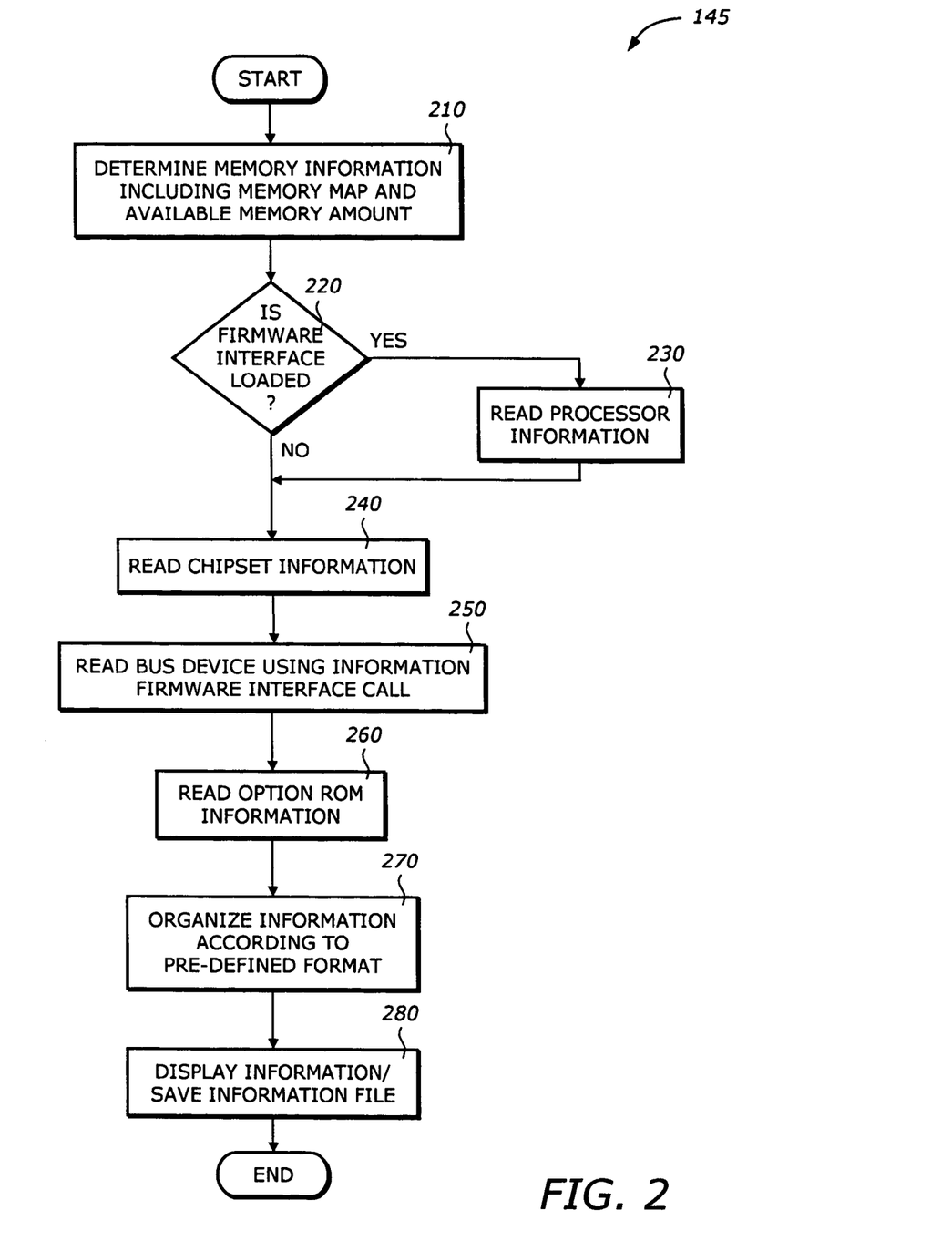
FIG. 2 is a flowchart illustrating a process to report platform information according to one embodiment of the invention.

FIG. 2 is a flowchart illustrating a process 200 to report system information according to one embodiment of the invention. The process 200 implements the system information reporting module 145 shown in FIG. 1.

Upon START, the process 200 determines memory information on the system memory 140 shown in FIG. 1 (Block 210). The information may include available memory amount or size. Next, the process 200 determines if the firmware interface has been loaded in the memory (Block 220). In one embodiment, the firmware interface is the Extensible Firmware Interface (EFI). In a multiprocessor system, the EFI is a multiprocessor EFI. If so, the process 200 reads the processor information from the processor (Block 230) and goes to Block 240. Otherwise, the process 200 reads chipset information from the chipset in the system (Block 240).

Next, the process 200 reads bus device information from the bus device using a firmware interface call (Block 250). The bus device may be a device, a board, a card, a circuit, a subsystem, or a module that is connected to the peripheral bus, such as the PCI bus. Then, the process 200 reads the option ROM information (Block 260). Next, the process 200 organizes the information according to a pre-defined format (Block 270). The pre-defined format may be suitable for displaying or data retrieval purposes. Then, the process 200 displays the information and/or saves the information in a file (Block 280) and is then terminated.

Figure 3:
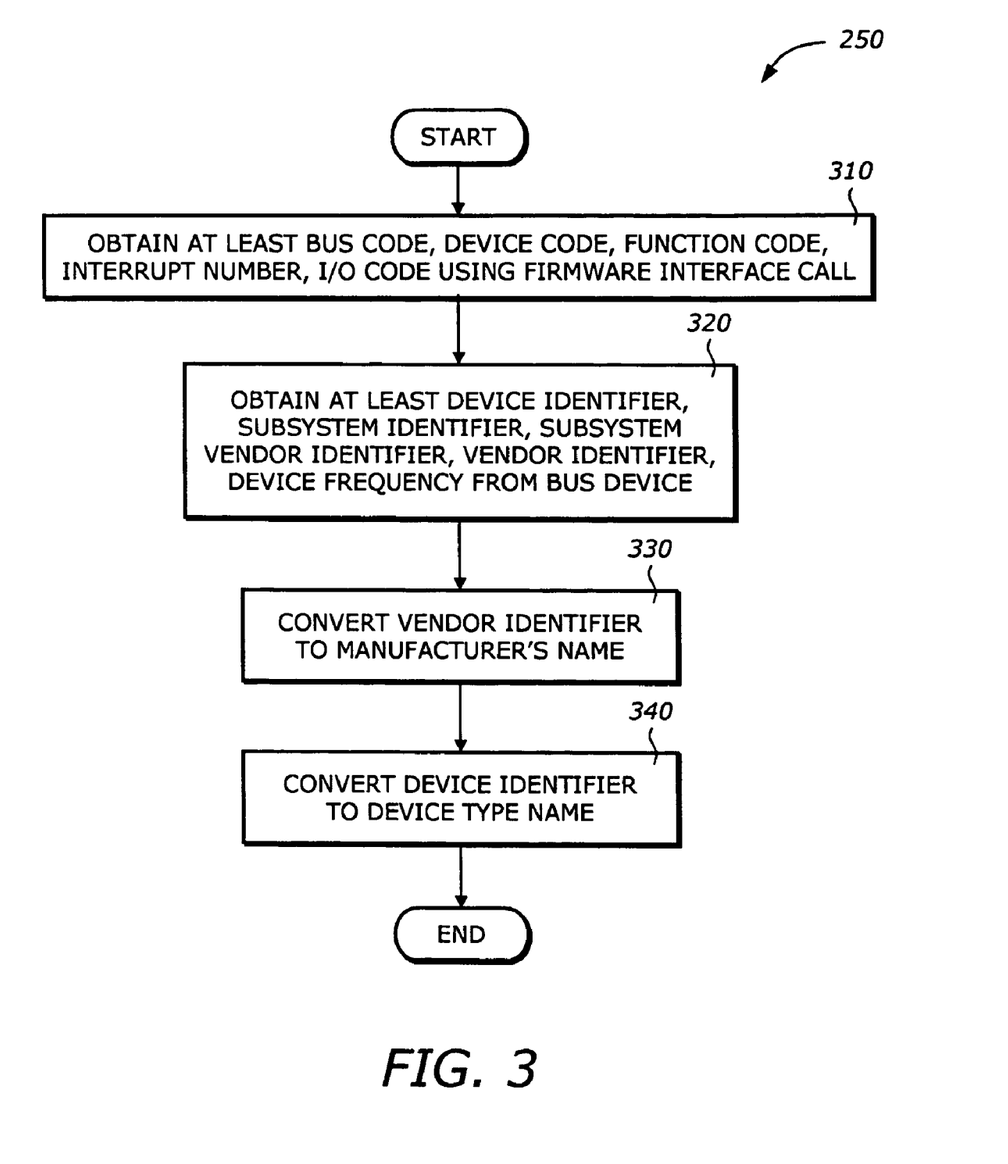
FIG. 3 is a flowchart illustrating a process to read bus device information according to one embodiment of the invention.

FIG. 3 is a flowchart illustrating the process 250 to read the bus device information according to one embodiment of the invention.

Upon START, the process 250 obtains at least one of a bus code, a device code, a function code, an interrupt number, and an Input/Output (I/O) code using a firmware interface call (Block 310). Next, the process 250 obtains at least one of a device identifier (DID), a subsystem identifier (SID), a subsystem vendor identifier (SVID), a vendor identifier (VID), and a device frequency from the bus device (Block 320). This can be performed by reading appropriate registers or locations from the bus device according to the corresponding specification or standard.

Then, the process 250 converts the vendor identifier to the corresponding manufacturer's name (Block 330). This can be performed by using a look-up table (LUT's) or array/file data structure that contains the names of the manufacturers and their corresponding vendor identifier. Next, the process 250 converts the device identifier to the corresponding device type (Block 340). This can be performed by using a look-up table (LUT's) or array/file data structure that contains the device types and their corresponding device identifier. By using the manufacturer's names and the device types in full form, rather than numbers or codes, the information is more readable, understandable, and informative. This is useful for reporting, documentation, and diagnostics.

Figure 4A:
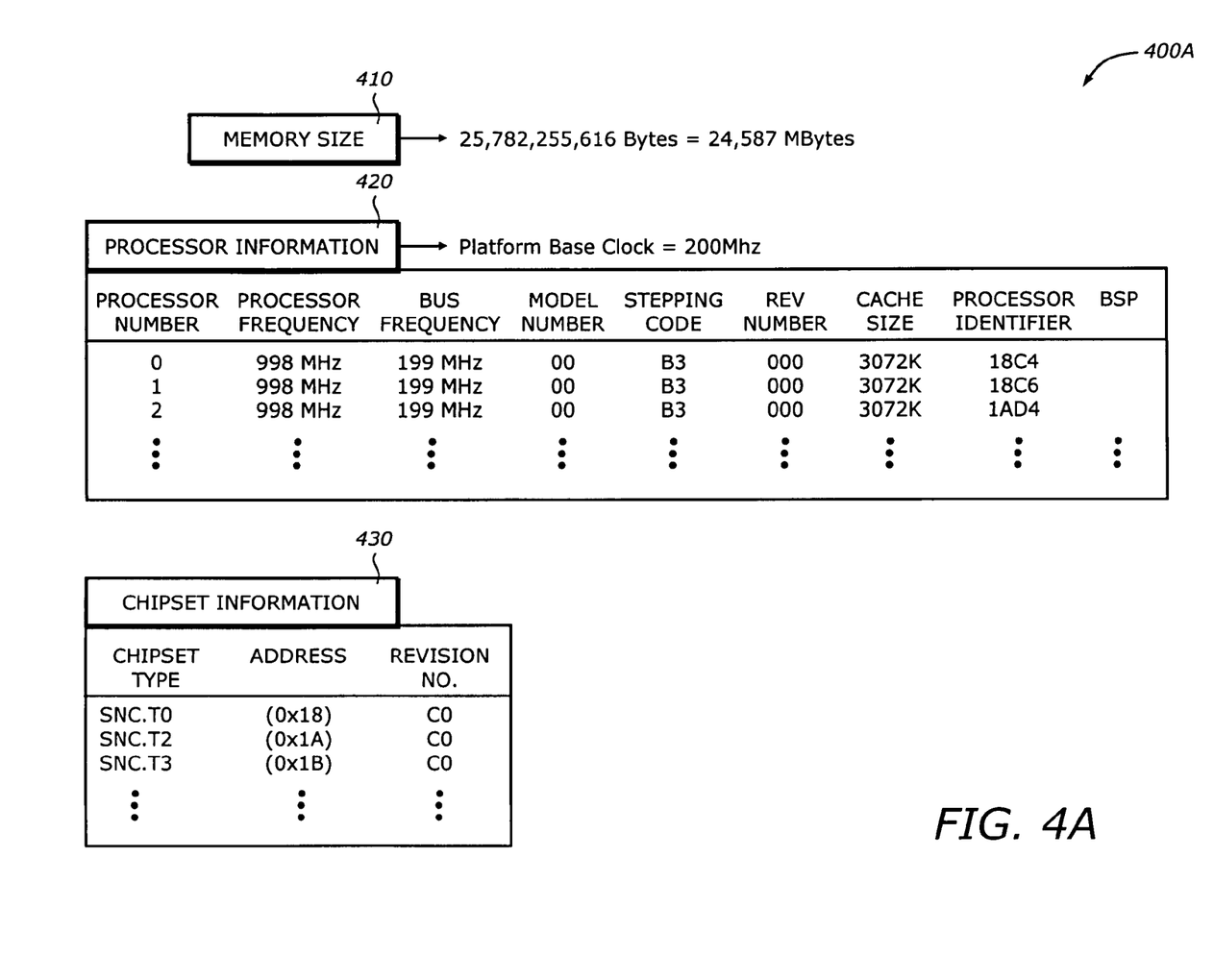
FIG. 4A is a diagram illustrating a first part of organization format according to one embodiment of the invention.

FIG. 4A is a diagram illustrating a first part 400A of organization format according to one embodiment of the invention. The first part 400A includes a memory size 410, a processor information 420, and a chipset information 430.

The memory size 410 displays or shows the total memory amount that is available. This can be expressed in terms of number of bytes or megabytes (MB). The processor information 420 shows the details and/or parameters of all the processors in the system. For a multiprocessor system, information on all processors is shown. The processor information 420 includes a processor number, a processor frequency, a bus frequency, a model number, a stepping code, a revision number, a cache size, a processor identifier, and a bootstrap processor (BSP) identification. The stepping code refers to the silicon revision of the processor. The BSP identification shows which processor is used as the BSP in a multiprocessor system.

The chipset information 430 includes information on all the chipsets, integrated devices, special-purpose processors, or any other Applications Specific Integrated Circuits (ASIC's). The chipset information 430 includes a chipset type, an address, and a revision number. The chipset type may be any type or functionality such as scalable node controller (SNC), scalability port switch (SPS), server I/O Hub (SIOH), and PCI hub (e.g., P64H4).

Figure 4B:
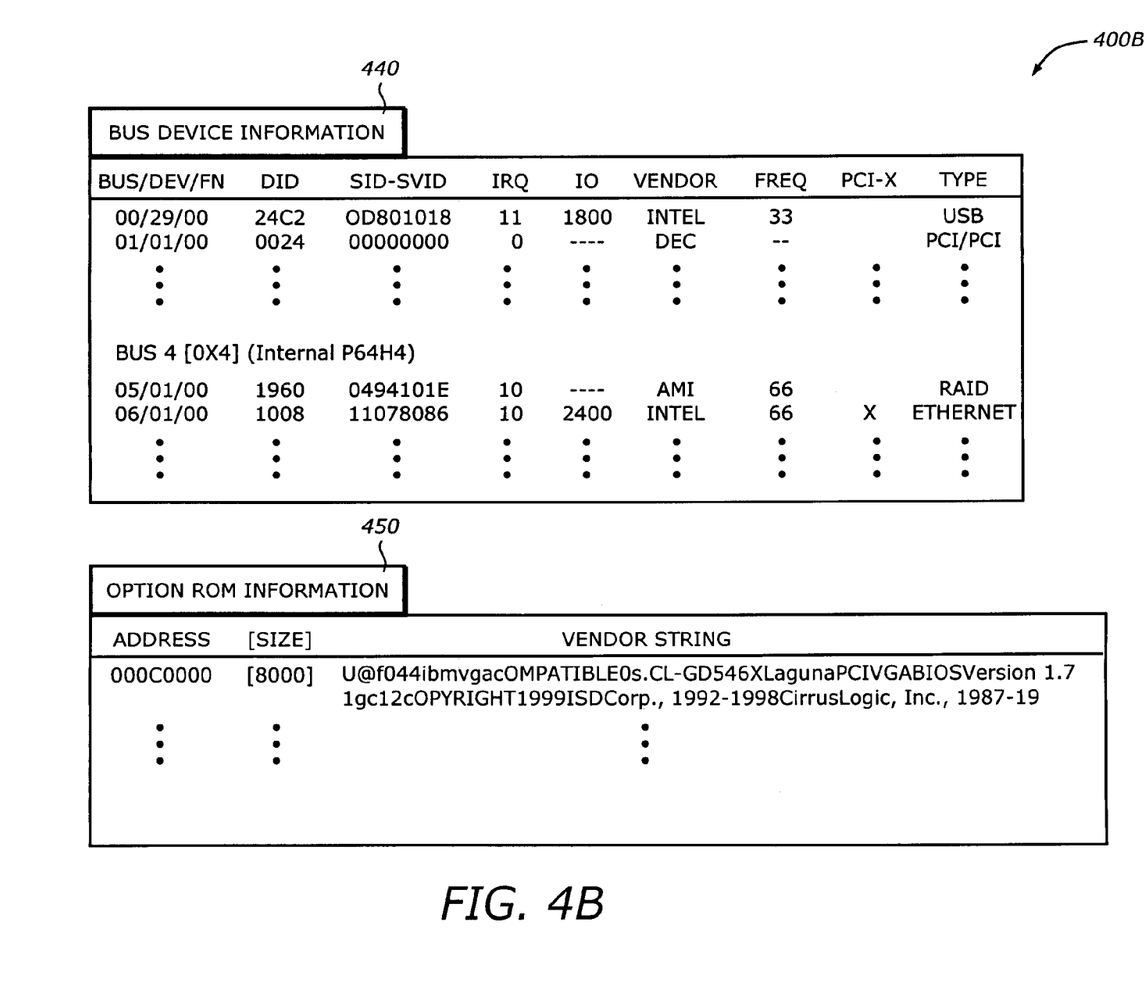
FIG. 4B is a diagram illustrating a second part of organization format according to one embodiment of the invention.

FIG. 4B is a diagram illustrating a second part 400B of organization format according to one embodiment of the invention. The second part 400B includes a bus device information 440 and an option ROM information 450.

The bus device information 440 shows information on a device or card connected to the peripheral bus as discussed above. The bus device information 440 may include bus, device, and function code, DID, SID, SVID, interrupt, I/O, Vendor, Frequency, PCI-x, and Type. The PIC-X is to determine if the bus is a PCI-X bus and not just a PCI device. The type indicates the type of the device such small computer interface devices. The option ROM information includes an address, a size, and a vendor string.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   reading information on system configuration of a platform having at least a processor, a memory, a chipset, and a bus device using a firmware interface, the information including at least processor information, memory information, chipset information, and bus device information, reading the information comprising:
   reading the chipset information from the chipset, and
   reading the bus device information from the bus device; and
   organizing the information according to a predefined format:
   wherein reading the bus device information comprises:
   obtaining at least a bus code, a device code, a function code, an interrupt number, and an input/output (I/O) code using a firmware interface call;
   obtaining at least a device identifier, a subsystem identifier, a subsystem vendor identifier, a vendor identifier, and a device frequency from the bus device;
   converting the vendor identifier to a manufacturer name; and
   converting the device identifier to a device type name.

2. The method of claim 1 wherein reading the information comprises:
   determining the memory information, the memory information including a memory map and a memory available amount,
   determining if the firmware interface is loaded into the memory; and
   reading the processor information from the processor.

3. The method of claim 2 wherein reading the processor information comprises:
   obtaining at least a processor number, a processor frequency, a bus frequency, a model number, a stepping code, a revision number, a cache information, a processor identifier, and a bootstrap processor identification.

4. The method of claim 1 wherein reading the information comprises:
   reading option read only memory (ROM) information from an option ROM.

5. The method of claim 1 wherein reading the chipset information comprises:
obtaining a revision number of at least one of a scaleable node controller (SNC), a scalability port switch (SPS), a server input/output hub (SIOH), and a peripheral bus hub.

6. The method of claim 1 wherein the bus device is a peripheral component interconnect (PCI) device.

7. The method of claim 1 wherein the processor is one of a 16-bit, 32-bit, and 64-bit processors.

8. The method of claim 1 wherein the platform is a multiprocessor platform.

9. An article of manufacture comprising:
a machine-accessible storage medium including data that, when accessed by a machine, causes the machine to perform operations comprising:
reading information on system configuration of a platform having at least a processor, a memory, a chipset, and a bus device using a firmware interface, the information including at least processor information, memory information, chipset information, and bus device information; wherein the data causing the machine to perform reading the information comprises data that, when accessed by the machine, causes the machine to perform operations comprising:
reading the chipset information from the chipset, and
reading the bus device information from the bus device; and
organizing the information according to a predefined format;
wherein the data causing the machine to perform reading the bus device information comprises data that, when accessed by the machine, causes the machine to perform operations comprising:
obtaining at least a bus code, a device code, a function code, an interrupt number, and an input/output (I/O) code using a firmware interface call;
obtaining at least a device identifier, a subsystem identifier, a subsystem vendor identifier, a vendor identifier, and a device frequency from the bus device;
converting the vendor identifier to a manufacturer name; and
converting the device identifier to a device type name.

10. The article of manufacture of claim 9 wherein the data causing the machine to perform reading the information comprises data that, when accessed by the machine, causes the machine to perform operations comprising:
reading option read only memory (ROM) information from an option ROM.

11. The article of manufacture of claim 9 wherein the data causing the machine to perform reading the information comprises data that, when accessed by the machine, causes the machine to perform operations comprising:
determining the memory information, the memory information including a memory map and a memory available amount,
determining if the firmware interface is loaded into the memory; and
reading the processor information from the processor.

12. The article of manufacture of claim 11 wherein the data causing the machine to perform reading the processor information comprises data that, when accessed by the machine, causes the machine to perform operations comprising:
obtaining at least a processor number, a processor frequency, a bus frequency, a model number, a stepping code, a revision number, a cache information, a processor identifier, and a bootstrap processor identification.

13. The article of manufacture of claim 9 wherein the data causing the machine to perform reading the chipset information comprises data that, when accessed by the machine, causes the machine to perform operations comprising:
obtaining a revision number of at least one of a scaleable node controller (SNC), a scalability port switch (SPS), a server input/output hub (SIOH), and a peripheral bus hub.

14. The article of manufacture of claim 9 wherein the bus device is a peripheral component interconnect (PCI) device.

15. The article of manufacture of claim 9 wherein the processor is one of a 16-bit, 32-bit, and 64-bit processors.

16. The article of manufacture of claim 9 wherein the platform is a multiprocessor platform.

17. A system comprising:
a processor;
a chipset coupled to the processor; and
a memory coupled to the processor, the memory containing instructions that, when executed by the processor cause the processor to:
read information on system configuration of the platform having at least the processor, the memory, the chipset, and a bus device using a firmware interface, the information including at least processor information, memory information, chipset information, and bus device information, wherein the instructions causing the processor to read the information comprises instructions that, when executed by the processor, cause the processor to:
read the chipset information from the chipset, and
read the bus device information from the bus device; and
organize the information according to a predefined format;
wherein the instructions causing the processor to read the bus device information comprises instructions that, when executed by the processor, cause the processor to:
obtain at least a bus code, a device code, a function code, an interrupt number, and an input/output (I/O) code using a firmware interface call;
obtain at least a device identifier, a subsystem identifier, a subsystem vendor identifier, a vendor identifier, and a device frequency from the bus device;
convert the vendor identifier to a manufacturer name; and
convert the device identifier to a device type name.

18. The system of claim 17 wherein the instructions causing the processor to read the information comprises instructions that, when executed by the processor, cause the processor to:
determine the memory information, the memory information including a memory map and a memory available amount,
determine if the firmware interface is loaded into the memory; and
read the processor information from the processor.

19. The system of claim 18 wherein the instructions causing the processor to read the processor information comprises instructions that, when executed by the processor, cause the processor to:
obtain at least a processor number, a processor frequency, a bus frequency, a model number, a stepping code, a revision number, a cache information, a processor identifier, and a bootstrap processor identification.

20. The system of claim 17 wherein the instructions causing the processor to read the information comprises instructions that, when executed by the processor, cause the processor to:

read option read only memory (ROM) information from an option ROM.

21. The system of claim 17 wherein the instructions causing the processor to read the chipset information comprises instructions that, when executed by the processor, cause the processor to:

obtain a revision number of at least one of a scaleable node controller (SNC), a scalability port switch (SPS), a server input/output hub (SIOH), and a peripheral bus hub.

22. The system of claim 17 wherein the bus device is a peripheral component interconnect (PCI) device.

23. The system of claim 17 wherein the processor is one of a 16-bit, 32-bit, and 64-bit processors.

24. The system of claim 17 wherein the platform is a multiprocessor platform.

* * * * *